US012473181B2

(12) United States Patent
Gabriel et al.

(10) Patent No.: US 12,473,181 B2
(45) Date of Patent: Nov. 18, 2025

(54) LIFTING DEVICE PROVIDED WITH AN AUXILIARY DEVICE FOR COUNTERACTING TIPOVER OF THE BOOM IN SUDDEN LOSS OF LOAD

(71) Applicant: DEME Offshore BE NV, Zwijndrecht (BE)

(72) Inventors: Jan Gabriel, Afsnee (BE); Jeroen Vanden Branden, Olen (BE)

(73) Assignee: DEME Offshore BE NV, Zwijndrecht (BE)

( * ) Notice: Subject to any disclaimer, the term of this patent is extended or adjusted under 35 U.S.C. 154(b) by 310 days.

(21) Appl. No.: 18/021,579

(22) PCT Filed: Aug. 5, 2021

(86) PCT No.: PCT/EP2021/071898
§ 371 (c)(1),
(2) Date: Feb. 16, 2023

(87) PCT Pub. No.: WO2022/037960
PCT Pub. Date: Feb. 24, 2022

(65) Prior Publication Data

US 2023/0312311 A1 Oct. 5, 2023

(30) Foreign Application Priority Data

Aug. 17, 2020 (BE) .................................. 2020/5573

(51) Int. Cl.
*B66C 23/92* (2006.01)

(52) U.S. Cl.
CPC .................................. *B66C 23/92* (2013.01)

(58) Field of Classification Search
CPC ..................................................... B66C 23/92
See application file for complete search history.

(56) References Cited

U.S. PATENT DOCUMENTS 2,318,491 A * 5/1943 Johnson .................. B66C 23/92 414/690
2,840,244 A * 6/1958 Thomas, Jr. ............ B66C 23/92 254/269

(Continued)

FOREIGN PATENT DOCUMENTS

CN 102275841 A 12/2011
CN 102328884 A 1/2012

(Continued)

*Primary Examiner* — Anna M Momper
*Assistant Examiner* — Nathaniel L Adams
(74) *Attorney, Agent, or Firm* — The Webb Law Firm

(57) ABSTRACT

Provided is a lifting device with a force-absorbing base to which a boom with hoisting cable for lifting a load in substantially vertical direction is tiltably connected. The lifting device is provided with an auxiliary device for counteracting tipover of the boom in the case of sudden loss of load. The auxiliary device is connected to the base of the lifting device, provides a contact surface which is in permanent contact with a contact surface of the boom or comes into contact therewith in the case of tipover, and further comprises a drive and control system which is configured to stop the boom movement when a predetermined force between the contact surfaces is exceeded as a result of the boom tipping over. The described auxiliary device can take an autonomous form and can be arranged on a lifting device.

15 Claims, 5 Drawing Sheets

(56) References Cited

U.S. PATENT DOCUMENTS

| | | | | | |
|---|---|---|---|---|---|
| 2,919,037 | A * | 12/1959 | Kahl, Jr. | B66C 23/92 212/293 |
| 3,868,022 | A * | 2/1975 | Greenlay | B66C 23/36 212/301 |
| 4,061,230 | A | 12/1977 | Goss et al. | |
| 5,676,264 | A | 10/1997 | Wilson | |
| 10,669,131 | B2 * | 6/2020 | Oka | B66C 23/92 |
| 2019/0345008 | A1 * | 11/2019 | Tsuboi | B66C 23/92 |
| 2024/0017970 | A1 * | 1/2024 | Yamamoto | E02F 3/962 |

FOREIGN PATENT DOCUMENTS

| | | | |
|---|---|---|---|
| CN | 102923589 | A | 2/2013 |
| CN | 105731281 | A | 7/2016 |
| CN | 206553112 | U | 10/2017 |
| EP | 3569562 | A1 | 11/2019 |

* cited by examiner

Boom 85 degrees
Outreach 25.1m

Boom 74 degrees
Outreach 45m

Boom 67.8 degrees
Outreach 55.8m

LIFTING DEVICE PROVIDED WITH AN AUXILIARY DEVICE FOR COUNTERACTING TIPOVER OF THE BOOM IN SUDDEN LOSS OF LOAD

CROSS REFERENCE TO RELATED APPLICATIONS

This application is the United States national phase of International Patent Application No. PCT/EP2021/071898 filed Aug. 5, 2021, and claims priority to Belgian Patent Application No. 2020/5573 filed Aug. 17, 2020, the disclosures of which are hereby incorporated by reference in their entireties.

BACKGROUND OF THE INVENTION

Field of the Invention

The invention relates to a lifting device with a force-absorbing base to which a boom with hoisting cable for lifting a load in substantially vertical direction is tiltably connected, wherein the lifting device is further provided with an auxiliary device for counteracting tipover of the boom in the case of sudden loss of load, for instance due to the hoisting cable breaking. The invention likewise relates to an auxiliary device for counteracting tipover of a boom in the case of sudden loss of a load.

The invention can in principle be applied to lift any object, both on land (onshore) and at sea (offshore). The advantages of the invention however become most clearly manifest when lifting an object offshore. A typical application for instance relates to offshore placing of a foundation for a wind turbine.

Description of Related Art

A lifting device for lifting a load generally comprises a force-absorbing base of which a so-called A-frame for instance forms part and to which a boom tiltable around a horizontal axis is connected. The base is configured to transmit the forces acting on the boom to a ground surface, for instance the deck and the hull of a vessel. The pivoting connection between the base and the boom allows the boom to be tilted with a so-called luffing cable in a vertical plane between the most luffed-in position, in which the boom is positioned at a minimal angle to the vertical direction, and the most luffed-out position in which the boom is positioned at a maximum angle to the vertical direction. The operating range of the boom then lies between these two positions. Connected to the boom is a hoisting cable to which a load can be attached for the purpose of lifting the load, wherein the hoisting cable extends in a substantially vertical direction.

When lifting a load it is possible that the boom suddenly falls backward and is forced beyond the most luffed-in position. Such tipover of the boom could for instance occur in the case of sudden loss of load, for instance due to the hoisting cable breaking, or in the event of the load suddenly detaching from the hoisting cable. When the load is lifted, a force opposite to the force of gravity exerted on the load is exerted on the lifting device. This force is particularly exerted on the hoisting cable, boom and luffing cable. Compared to the two cables, the boom is relatively rigid and will not deform a great deal. Elastic energy will however be built up in the hoisting cable and the luffing cable. In the case of such so-called sudden loss of load the boom tends to 'shoot' away from the load due to the suddenly released elastic energy built up in the luffing cable. If the lifting device is located on a vessel and the boom protrudes transversely, for instance to starboard (SB), water ballast may be taken on on the opposite port side (PS) in order to restore equilibrium. In that case the equilibrium is disrupted in the case of a sudden loss of load and the ship will begin to roll, away from the load, in this case to PS. This has the result that the boom co-rotates around the base and is as it were luffed in further. This strengthens the tipover effect, and it is then even possible that the boom moves over its vertical equilibrium point and destroys itself. Such a situation is of course highly undesirable.

It is noted that the term 'tipover' is not limited to the above described movement of the boom beyond the vertical point of equilibrium. Even if the boom were not to 'tip over' in this way and the luffing cable instead becomes slack due to a sudden rearward movement (away from the load) of the boom, the luffing cable may afterwards come under tension again with sudden force. The luffing cable, but also the boom, can be overloaded by such a snatch load. This phenomenon is also grouped under 'tipover', and must also be avoided.

An object of the present invention is to provide an auxiliary device for counteracting tipover of the boom in the case of sudden loss of load, and a lifting device provided with the auxiliary device. This avoids the damage associated with tipover, or at least reduces the risk thereof.

SUMMARY OF THE INVENTION

This object is achieved by providing a lifting device with the characteristics herein. The invented lifting device comprises a force-absorbing base to which a boom with hoisting cable for lifting a load in substantially vertical direction is tiltably connected, and is further provided with an auxiliary device for counteracting tipover of the boom in the case of sudden loss of load, for instance due to the hoisting cable breaking, wherein the auxiliary device is connected to the base of the lifting device, provides a contact surface which is in contact with a contact surface of the boom or comes into contact with a contact surface of the boom in the case of tipover, and further comprises a drive and control system which is configured to stop or to block the boom movement when a predetermined force between the contact surfaces is exceeded as a result of the boom tipping over.

In an embodiment in which the contact surface of the auxiliary device is in contact with the contact surface of the boom, the boom will during normal movement of the boom exert a force on the auxiliary device which is lower than the predetermined maximum force. The contact surface of the auxiliary device is then freely co-displaceable with the movement of the boom. In the case of tipover, the force exerted on the auxiliary device will exceed the predetermined maximum force. The drive and control system will then ensure that the movement of the contact surfaces is stopped, inhibited or blocked, for instance by blocking means suitable for this purpose. This prevents the boom from tipping over.

In an embodiment in which the contact surface of the auxiliary device comes into contact with the contact surface of the boom in the case of tipover, the boom will exert substantially no force on the auxiliary device during normal movement of the boom. Because the predetermined force—which can otherwise have a different value in this embodiment than in the above described embodiment, even zero—is not exceeded, the contact surface of the auxiliary device will be freely co-displaceable with the movement of the boom, and follow the movement of the boom. In the case of tipover the boom will come into contact with the contact surface of the auxiliary device. The force exerted on the auxiliary device then exceeds the predetermined force, whereby the drive and control system will ensure that the movement of the contact surfaces is stopped, inhibited or blocked, for instance by the blocking means. This prevents the boom from tipping over.

In an embodiment of the lifting device the contact surface of the auxiliary device is in contact with the contact surface of the boom by connecting the auxiliary device, and more particularly a moving part thereof, to the boom, preferably at an outer end of this moving part.

In another embodiment of the lifting device the drive and control system is configured to hold the contact surface of the auxiliary device and the contact surface of the boom at a small mutual distance so that the boom is only capable of limited acceleration during tipover.

The invented auxiliary device is able to stop the boom immediately (or in a relatively short amount of time) following a sudden loss of load. This prevents the boom from being able to accelerate or build up kinetic energy. The auxiliary device is connected to the base in order to be able to transmit the forces caused by the rebounding of the boom to a ground surface connected to the base, such as for instance the hull of a vessel.

The lifting device can be used onshore, and further on any type of vessel, wherein the advantages of the invention become particularly manifest in use on a monohull crane vessel. The auxiliary device is further configured to stop the (accelerating) boom in positions lying between the most luffed-in and the most luffed-out position. According to the invention, it is not necessary to stop the (accelerating) boom in all positions lying between the most luffed-in and the most luffed-out position. It may suffice to provide only a part of this range, for instance from the most luffed-in position to a position halfway to the most luffed-out position.

According to an embodiment of the invention, the contact surface of the auxiliary device is held at a small mutual distance from a contact surface of the boom by a drive and control system so that the boom is only able to accelerate to limited extent during tipover. The auxiliary device is therefore not connected to the boom in this embodiment. This has the advantage that any movements—for instance torsion or bending—of the boom during normal use will not be transmitted to the auxiliary device. The auxiliary device can hereby take a relatively light form.

The small mutual distance can be selected within limits. A practical embodiment relates to a lifting device wherein the mutual distance between the two contact surfaces is kept between a minimum and a maximum distance.

In a suitable embodiment a lifting device is provided wherein the minimum distance amounts to between 1 and 10 mm and the maximum distance to between 5 and 30 mm. In normal use of the boom (so in a situation wherein no tipover is occurring) the contact surface of the auxiliary device is then held at a distance which can lie between 1 and 30 mm.

It is further advantageous to characterize the lifting device in that the mutual distance between the two contact surfaces is kept constant by the drive and control system. It is for instance possible here to control on the basis of vector distance. A further improved embodiment of the lifting device comprises a driving and control system which is configured to control the mutual distance in a horizontal direction, preferably keep it within limits, and still more preferably keep it constant.

A suitable embodiment of the invention provides a lifting device wherein the boom has two legs and the auxiliary device provides two contact surfaces which, in the case of tipover, come into contact with two corresponding contact surfaces of the boom.

In an embodiment of the invention it is further possible to characterize the lifting device in that the boom is tiltable around a tilting point and the contact surface of the boom lies at least at ⅖ of and more preferably at least halfway along the length of the boom from the tilting point. This makes it possible to limit the forces acting on the auxiliary device in the case of tipover.

In another embodiment the base of the lifting device comprises an A-frame and the auxiliary device is connected to the A-frame of the lifting device, preferably to an upper side of the A-frame.

The auxiliary device can take any suitable form, as long as it provides a contact surface for the boom and can stop the boom in case of a sudden rearward movement away from the load.

A practical embodiment relates to a lifting device wherein the auxiliary device comprises a frame to which is attached a support beam which is displaceable in horizontal direction between end positions using the drive system, wherein an end surface of the support beam forms the contact surface.

In an embodiment a particularly suitable drive system comprises a rack and pinion system comprising a gear rack driven by a pinion. An outer end of the gear rack provides the contact surface with the boom. The rack and pinion system takes a form such that it is able to absorb the forces acting on the auxiliary device by the accelerating boom in the case of tipover, so that the movement of the boom is counteracted.

In a suitable embodiment the lifting device has the feature that the pinion stops the boom movement through the action of blocking means, for instance a brake acting on the pinion, when a predetermined maximum torque as a result of tipover of the boom is exceeded. The pinion can for instance be driven by an electric drive, for instance an electric motor. If the drive torque exceeds a predetermined torque (which is derived from the predetermined force) in the case of tipover, a brake on the electric drive is activated so that this drive is stopped and blocked. A suitable brake can for instance comprise a number of plates which are held apart with an electromagnet. Activation of the brake turns off the electromagnet, whereby springs 'slam' the plates against each other. It will be apparent that there are multiple options and that the invention is not limited to this specific embodiment.

A rack and pinion system is per se known and is for instance used in jack-up platforms, particularly for moving the legs of such a jack-up platform up and downward. A rack and pinion system is able to transmit relatively great forces.

In order to be able to adjust the mutual distance between the contact surfaces automatically the lifting device is provided in an embodiment with a control system comprising measuring means for measuring the mutual distance between the two contact surfaces. Any measuring means suitable for this purpose can in principle be applied. The measuring means preferably comprise optical measuring means.

In an embodiment the measuring means are provided at the position of the contact surface of the auxiliary device.

The auxiliary device as provided on a lifting device can be integrated with the lifting device. According to another aspect of the invention however, an auxiliary device is provided which is autonomous and can be placed on a lifting device. Such an auxiliary device for counteracting tipover of a boom in the case of sudden loss of a load can be connected to the base of the lifting device, provides a contact surface which comes into contact with a contact surface of the boom in the case of tipover, and further comprises a drive and control system which is configured to hold the contact surface of the auxiliary device and the contact surface of the boom at a small mutual distance so that the boom is only capable of limited acceleration during tipover.

Possible embodiments of the auxiliary device have already been described at length above, and a reference to this description will suffice hereinbelow.

In the case the auxiliary device is applied in combination with a lifting device for lifting a load at sea, such as for instance components of a wind turbine, work preferably takes place from a (floating) vessel, or from a jack-up platform, which provides more stability.

BRIEF DESCRIPTION OF THE DRAWINGS

Further embodiments, and both the features and additional advantages thereof, will be further elucidated with reference to the accompanying figures, wherein.

DESCRIPTION OF THE INVENTION

Figure 1:
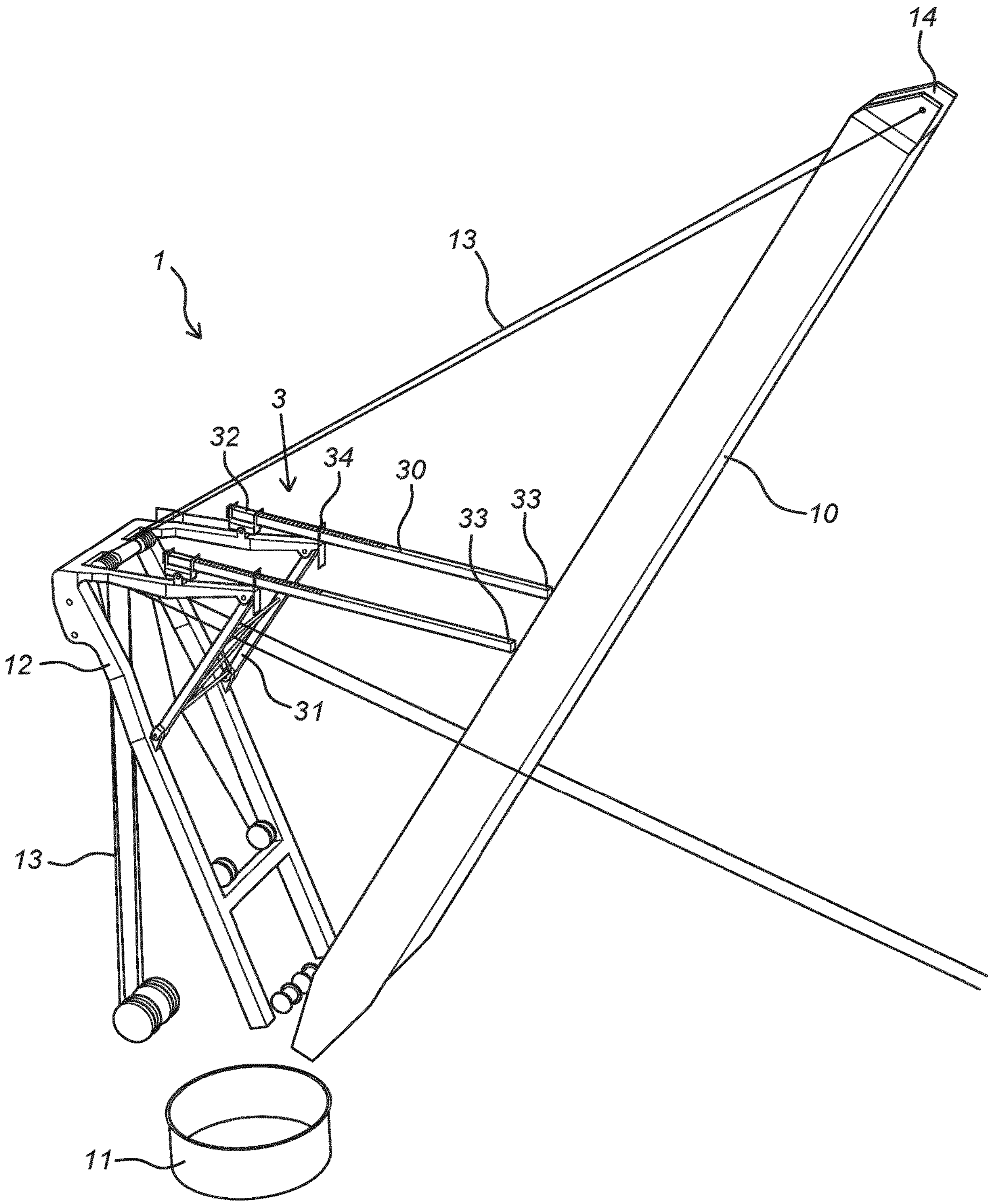
FIG. 1 is an isometric side view of a lifting device according to an embodiment of the invention.

The same or similar components are designated in the figures with the same reference numerals.

FIG. 1 shows a lifting device 1 according to the invention. This embodiment consists of, among other things, a force-absorbing base, itself consisting of a bottom frame 11, and an A-frame 12. A boom 10 is arranged tiltably on the force-absorbing base. A luffing cable 13 is further arranged from roughly the height of bottom frame 11, over an upper outer end of A-frame 12 and at least to an upper outer end 14 of boom 10 for the purpose of lifting a load in substantially vertical direction. Luffing cable 13 may also be tensioned along other paths. Lifting device 1 is optionally also rotatable in that bottom frame 11 is a rotatable bottom frame or because bottom frame 11 is arranged on another rotatable element.

Such a lifting device is susceptible to tipover, which occurs in the case of sudden loss of load. This can for instance occur when the hoisting cable breaks, when a hook or other connecting means connecting the hoisting cable to a load breaks, or when the load itself partially or wholly collapses.

Tipover includes any undesired movement of boom 10 as a result of the release of tension built up in boom 10. In the case of severe tipover there is a risk that boom 10 ends up in a fully upright position and that remaining momentum tilts the whole or a part of boom 10 beyond this point, after which the part of boom 10 tilted beyond this upright point will fall backward. This is also referred to as complete tipover. In the case of less severe but nevertheless serious tipover there is a risk that boom 10 becomes only partially more upright and that luffing cable 13 thereby becomes slack. When boom 10 then falls back forward, tension will return to luffing cable 13 with sudden force. This is also referred to as a snatch load. Just as complete tipover, snatch load has disastrous consequences.

FIG. 1 therefore further shows that lifting device 1 is provided with an auxiliary device 3 which in this embodiment is arranged at an upper outer end of A-frame 12. It is also possible to mount auxiliary device 3 lower on A-frame 12 or on a different part of the force-absorbing base. Auxiliary device 3 consists particularly of, among other things, frame 31, on which a rack and pinion system 32 and an orienting device 34 are arranged. In this embodiment rack and pinion system 32 and orienting device 34 form the drive and control system, and in other embodiments the drive and control system can also consist of different components. A support beam 30 is arranged in each rack and pinion system 32. The outer end of support beam 30 which is directed toward boom 10 provides a contact surface 33. Support beam 30 can be displaced substantially in horizontal direction between end positions by the drive and control system, in this embodiment by rack and pinion system 32.

A corresponding number of contact surfaces 33' can be designated on boom 10, this at positions where contact surface 33 comes into contact with boom 10 in the case of sudden loss of load.

In order to prevent boom 10 from gaining momentum during tipover, i.e. to prevent boom 10 from accelerating too much, the distance between contact surfaces 33, 33' is kept small. In this embodiment in that the drive system is able to displace contact surface 33.

As soon as contact surfaces 33, 33' come into contact with each other, part of the momentum of boom 10 is absorbed by auxiliary device 3. This part is proportionate to the portion of boom 10 which is situated below contact surface 33'. A remaining part of the momentum of boom 10 which is not absorbed by contact surface 33 strains the integrity of boom 10. If the remaining momentum turns out to be too much for the integrity of boom 10 despite auxiliary device 3, boom 10 may still tip over. It is therefore preferred that contact surface 33' is situated as high up as possible on boom 10. In specific embodiments these contact surfaces on boom 10 are thus located at at least ⅖ of boom 10, and preferably at least halfway along the height of boom 10.

Orienting device 34 controls the angle of orientation of support beam 30 relative to boom 10 from frame 31. Orienting support beam 30 in this way enables contact surface 33' to be made independent of the angle of tilt of boom 10, which has the advantage that, if it is desired to reinforce the contact surface on boom 10, only a small part of boom 10 need be reinforced. A further advantage of orienting contact surface 33 relative to boom 10 in this way is that, when contact surfaces 33, 33' come into contact with each other, this surface is immediately as large as possible—or, in other words, that contact surfaces 33, 33' come into contact with each other in the most frontal way possible. This is desirable since, if support beam 30 were to come into contact with boom 10 at an angle, it could absorb less of the momentum of boom 10 and/or do undesirable damage to boom 10.

The shown embodiment of auxiliary device 3 comprises two contact surfaces 33. It is also possible to provide only one, or three or more contact surfaces. The number of desired contact surfaces is for instance determined on the basis of the number of legs of boom 10. In the shown embodiment boom 10 has two, although it is also possible for boom 10 to consist of only one leg.

In the shown embodiment the base is provided with A-frame 12. The figure shows two slightly inclining posts and a number of beams connecting the posts. The A-frame is further optionally provided with two rear legs extending further rearward, down from the top part of A-frame 12. Further frame forms which fulfil this function can also be provided.

Figure 2:
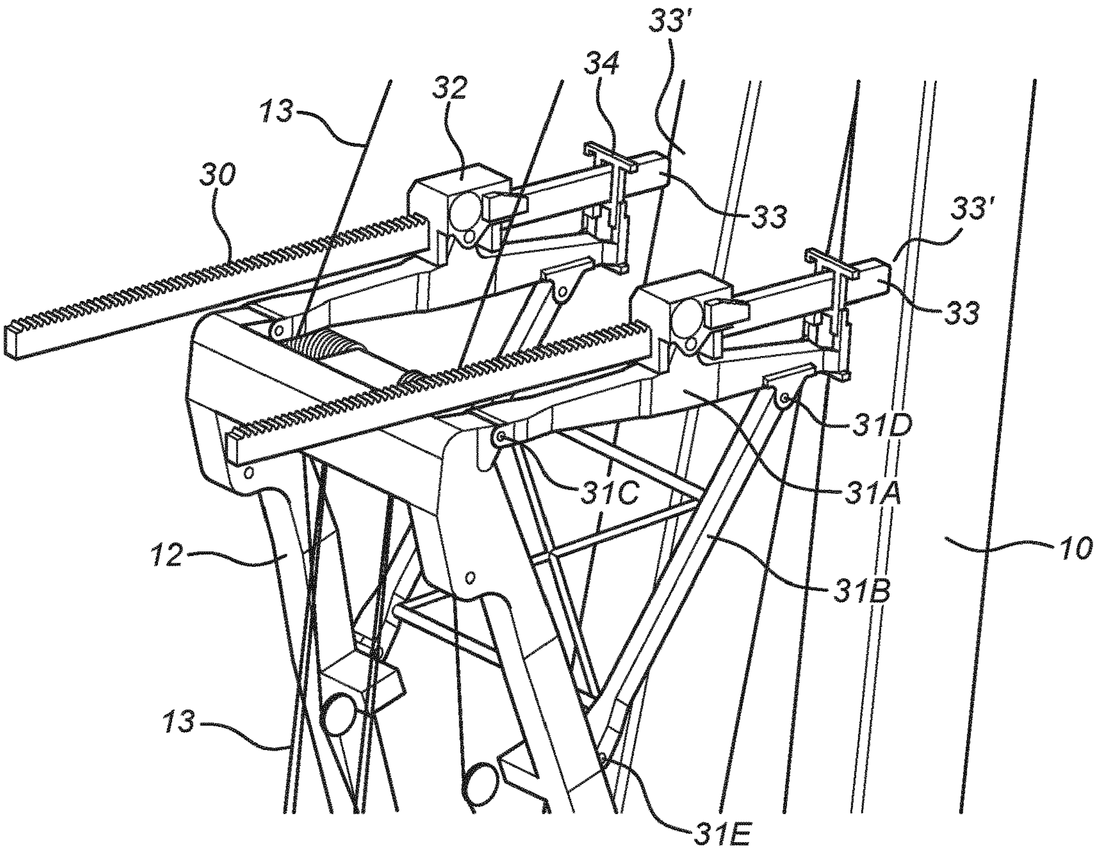
FIG. 2 is an isometric rear view of a detail of the lifting device of FIG. 1.

FIG. 2 shows a detail of lifting device 1, once again showing boom 10, A-frame 12 and luffing cable 13. This figure further shows the construction of frame 31, on which two support beams 30 rest in this case. For each support beam frame 31 is provided with a horizontal leg 31A and a diagonal leg 31B, wherein these legs are attached to each other at a protruding outer end 31D and, at an outer end 31C, 31E lying opposite, are both connected to A-frame 12.

FIGS. 1 and 2 together show that this embodiment of lifting device 1 is suitable for lifting a load on a first side thereof. In this embodiment boom 10 is arranged on the base so as to be tiltable toward this first side of lifting device 1. As seen from boom 10, the side toward which it can tilt is also a first side for which boom 10 is configured to lift. When no auxiliary device 3 is provided, boom 10 will accelerate in a direction opposite to the direction in which boom 10 can tilt when a load is released suddenly.

In this embodiment auxiliary device 3 is therefore preferably arranged on a second side of boom 10, lying opposite the first side, and auxiliary device 3, particularly contact surface 33, thereby lies in a path which would be travelled by boom 10 in the case of sudden loss of load.

Figure 3:
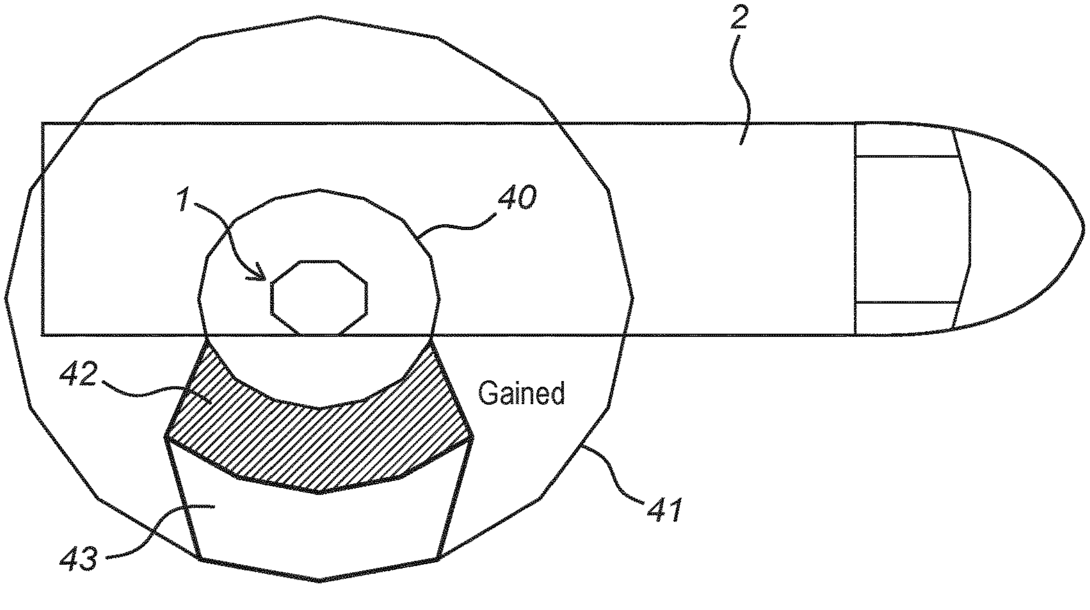
FIG. 3 is a schematic top view of a ship on which a lifting device according to an embodiment of the invention is arranged.

FIG. 3 shows a schematic top view of a vessel 2 on which lifting device 1 according to the invention is provided. In this embodiment lifting device 1 can also be rotated. In this embodiment boom 10 is therefore configured to lift a load in the area extending from an inner radius 40—wherein boom 10 is positioned as upright as possible—and an outer radius 41—wherein boom 10 is tilted forward as far as possible. Auxiliary device 3 makes it possible to avoid tipover of boom 10 in sudden loss of load during lifting of this load within a low-risk area 42. As indicated above, it is possible for boom 10 to be configured to tilt beyond the point where auxiliary device 3 can prevent tipover, this leaving an area 43 where the risk is as usual.

Figure 4C:
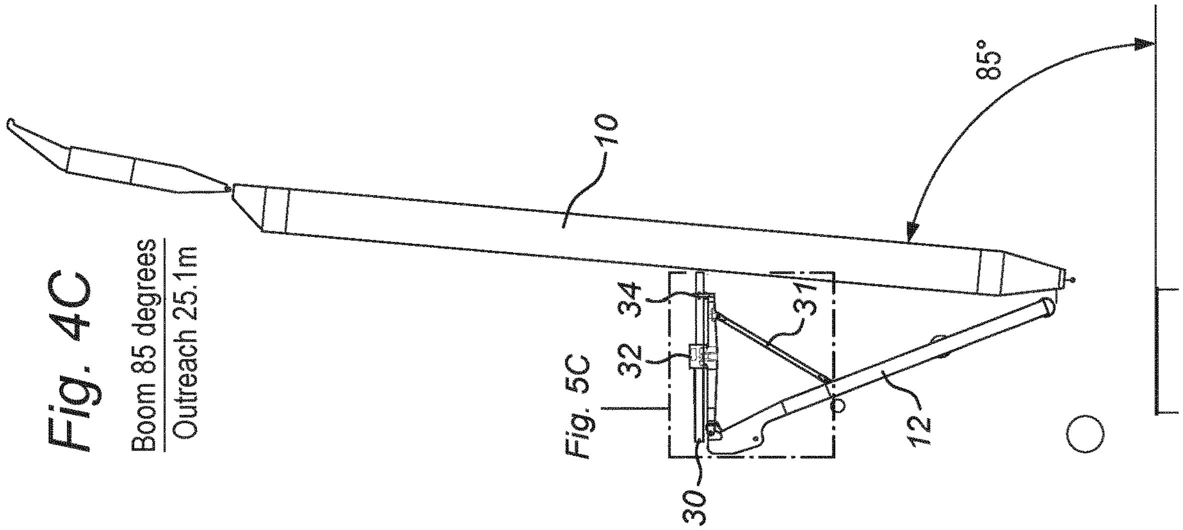
FIGS. 4A-4C are side views of a lifting device with auxiliary device according to an embodiment of the invention, at different angles of tilt.
Figure 4B:
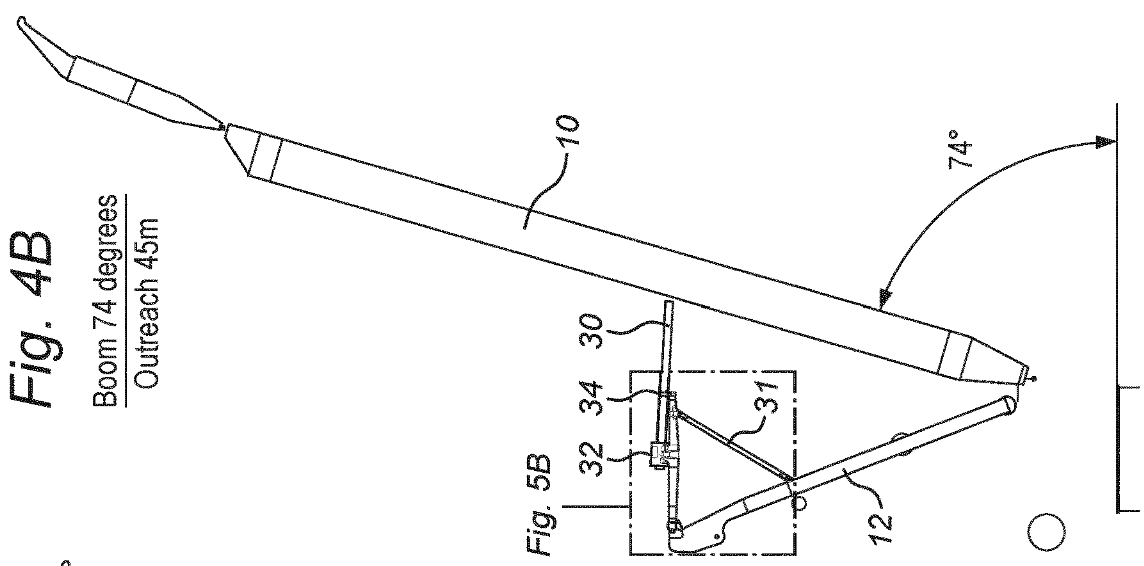
Figure 4A:
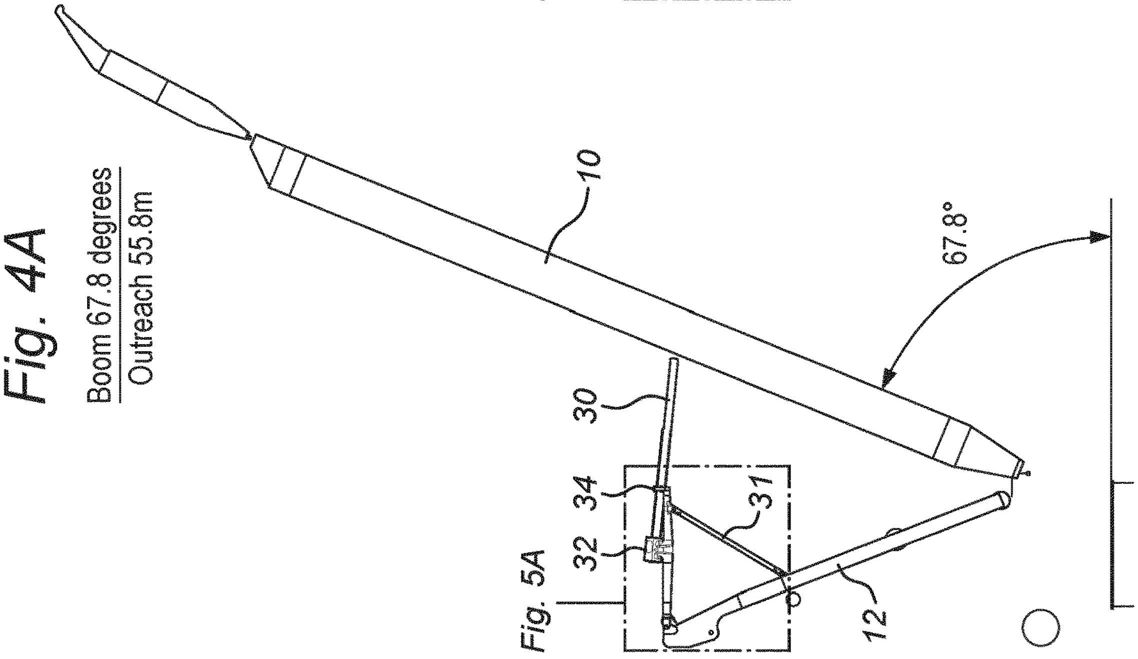
Figure 5A:
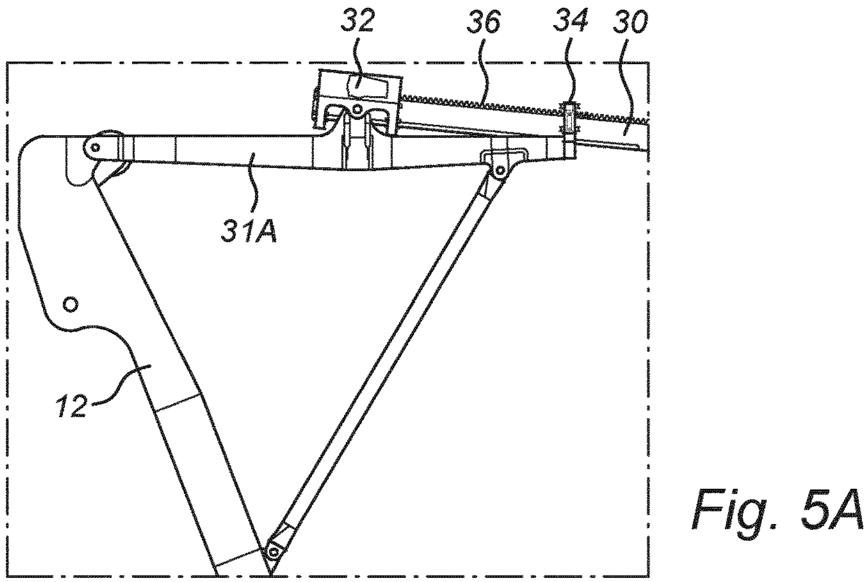
FIGS. 5A-5C are details of the side views of FIGS. 4A-4C; and, finally
Figure 5B:
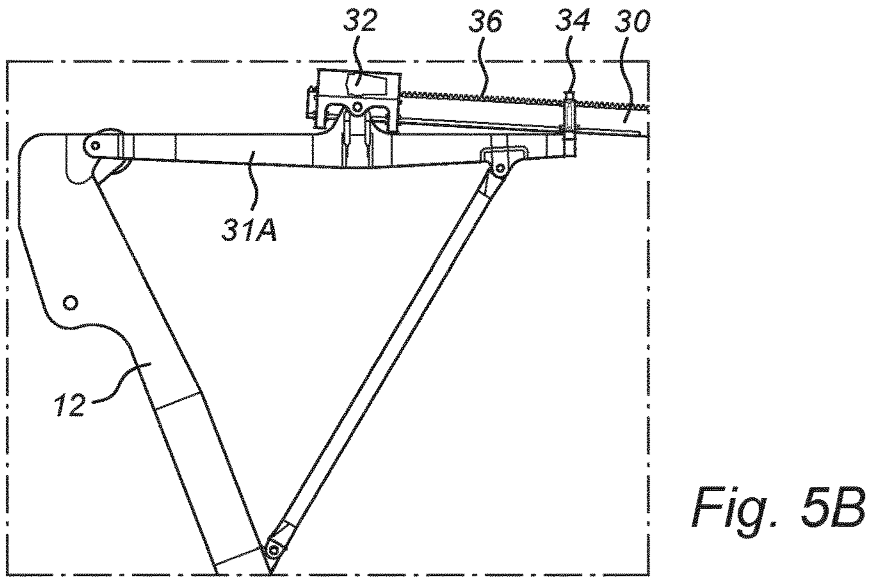
Figure 5C:
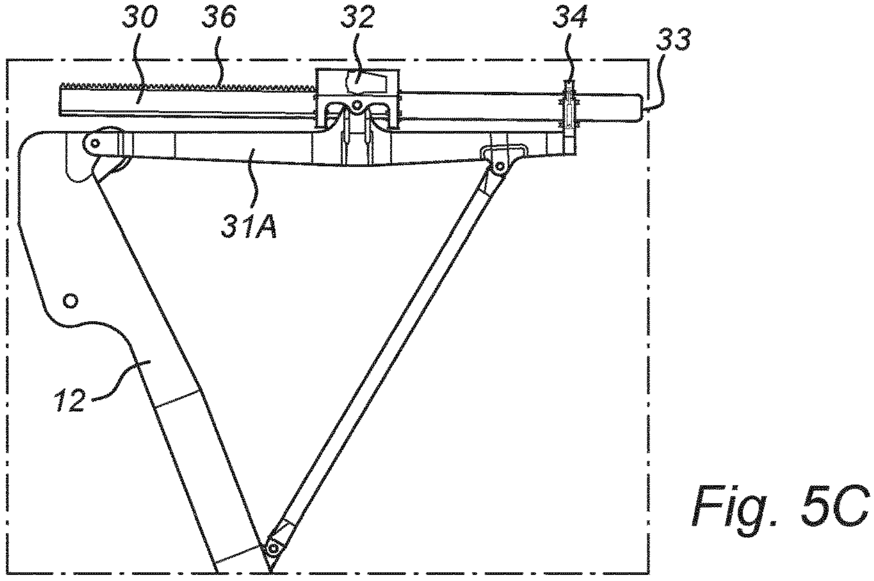

FIGS. 4A-4C show side views of lifting device 1 as described above with reference to FIGS. 1 and 2. In particular, FIGS. 4A-C once again show boom 10, A-frame 12 and auxiliary device 3, wherein this embodiment of auxiliary device 3 once again consists of frame 31, drive and control system 32, 34 and support beam 30 comprising contact surface 33. FIGS. 5A-C show details of these side views, wherein the figures with the same letter designation correspond to each other.

Of the shown side views, boom 10 has the greatest outreach in FIG. 4A. In this case auxiliary device 3 can no longer keep the distance between the contact surfaces small when boom 10 tilt beyond this first angle of tilt. The effectiveness with which auxiliary device 3 can counteract tipover of boom 10 will therefore decrease proportionally to how far boom 10 tilts beyond this angle. A second angle of tilt can therefore be designated, for which it is the case that when boom tilts beyond it, auxiliary device 3 can no longer prevent boom 10 from tipping over in the case that the boom experiences sudden loss of load.

FIG. 5A shows in more detail that, in order to keep the distance between contact surface 33 and the opposite contact surface of boom 10 small, support beam 30 is extended to an extreme position. In this case orienting system 34 has oriented support beam 30 downward at the greatest possible angle.

In FIG. 4B boom 10 has a smaller outreach than in FIG. 4A. In a preferred embodiment the mutual distance between the two contact surfaces is kept constant at all times while boom 10 is being adjusted. For instance when boom 10 is being adjusted from the angle of tilt as shown in FIG. 4A to a smaller angle of tilt as shown in FIG. 3B.

In order to realize this, lifting device 1 can be provided with measuring means for measuring the mutual distance between the two contact surfaces. Such measuring means can for instance comprise optical measuring means, which can particularly be arranged on frame 31 or on support beams 30. From frame 31, an absolute angle of tilt of boom 10 can be measured, and it is possible to estimate how far support beam 30 must protrude in order to keep the mutual distance between the contact surfaces small. From support beam 30, a relative distance between boom 10 and the measuring means can be measured. If these measuring means are arranged on support beam 30 in fixed manner then the distance between contact surface 33 and boom 10 can also be derived, and thus be kept constant by having the drive and control systems 32 controlled by the measuring means displace support beams 30.

FIG. 5B shows in more detail that support beam 30 has been co-displaced with boom 10 in order to keep the distance between contact surface 33 and the opposite contact surface of boom 10 small. The angle of orientation of support beam 30 relative to boom 10 has been reduced by orienting system 34.

Of the shown side views, boom 10 has the smallest outreach in FIG. 4C. In each of these embodiments the mutual distance between the two contact surfaces is kept between a minimum and maximum distance. The minimum distance for instance amounts to between 1 and 5 mm and the maximum distance for instance amounts to between 5 and 10 mm. This mutual distance relates mainly to the mutual distance in horizontal direction.

FIG. 5C shows in more detail that support beam 30 has once again been co-displaced with boom 10 by drive and control system 32, 34 in order to keep the distance between contact surface 33 and the opposite contact surface of boom 10 small. The angle of orientation of support beam 30 relative to boom 10 has also been reduced, and support beam 30 is substantially horizontal in this position.

Figure 6:
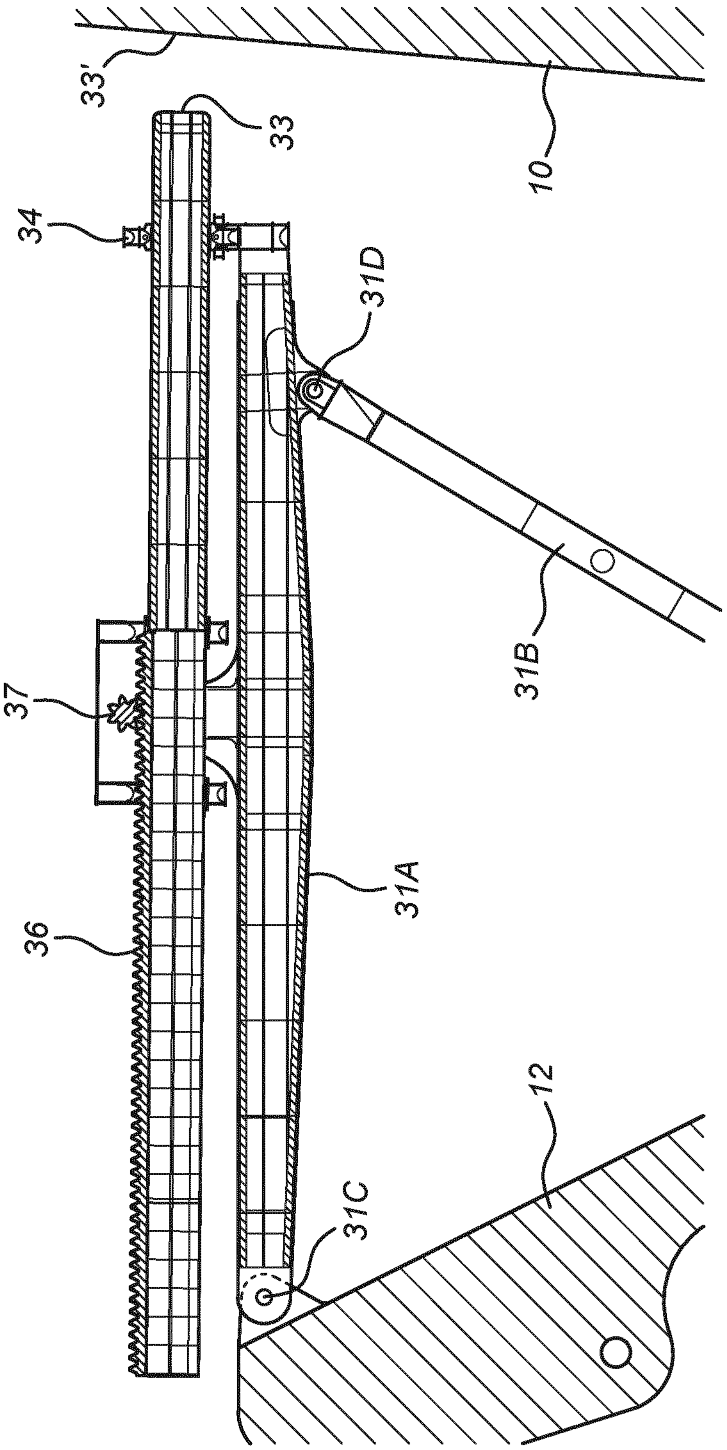
FIG. 6 is a cross-section of an auxiliary device according to an embodiment of the invention.

FIG. 6 shows a cross-section of an embodiment of auxiliary device 3 according to the invention. Once again, lifting device 1 comprises boom 10 and, as part of the force-absorbing base, A-frame 12, and auxiliary device 3. In this embodiment rack and pinion system 32 consists of a pinion 37 and a gear rack 36 arranged on support beam 30. When pinion 37 rotates, support beam 30 is displaced in a desired direction via gear rack 36. As stated above, this is done in order to keep the distance between contact surfaces 33, 33' small.

In the case of tipover it is however desirable for support beam 30 not to move, or hardly so, relative to frame 31 connected to the force-absorbing base. In a preferred embodiment rack and pinion system 32 is therefore provided with blocking means which counteract any movement of support beam 30 relative to horizontal leg 31A in the case of tipover. It should also be appreciated that in this embodiment horizontal leg 31A takes a heavier form than diagonal leg 31B, so that the risk of horizontal leg 31A collapsing when contact surfaces 33, 33' come into contact is minimized.

The blocking means can for instance block movement of support beam 30 as soon as support beam 30 is no longer being moved, i.e. when boom 10 has a constant angle of tilt. In this case support beam 30 is preventatively blocked, and will indeed be blocked more frequently in the case of tipover. The angle of tilt of boom 10 is however often not constant; also for reasons other than boom 10 being tilted by lifting device 1. In the case that boom 10 tilts or twists slightly, for instance due to wind forces, it is still desirable to keep the distance between contact surfaces 33, 33' small. It may therefore occur that support beams 30 are adjusted frequently, in which case support beams 30 would therefore find themselves not blocked with the same frequency. In a preferred embodiment rack and pinion system 32 is therefore provided with force detection means configured to detect whether an external force is being exerted on support beam 30, for instance in the direction from boom 10, and to control the blocking device to block support beam 30.

The invention claimed is:

1. An auxiliary device for counteracting tipover of a boom in the case of sudden loss of a load, wherein the auxiliary device can be connected to a base of a lifting device, provides a contact surface which comes into contact with a contact surface of the boom in the case of tipover, and further comprises a drive and control system which is configured to stop the boom movement when a predetermined force between the contact surfaces is exceeded as a result of the boom tipping over;

wherein the drive and control system is configured to hold the contact surface of the auxiliary device and the contact surface of the boom at a small mutual distance so that the boom is only capable of limited acceleration during tipover;

wherein the drive and control system comprises measuring means for measuring the mutual distance between the two contact surfaces; and wherein the measuring means comprises optical measure means.

2. A lifting device comprising a force-absorbing base to which a boom with hoisting cable for lifting a load in substantially vertical direction is tiltably connected, wherein the lifting device is further provided with an auxiliary device for counteracting tipover of the boom in the case of sudden loss of load, wherein the auxiliary device is connected to the base of the lifting device, provides a contact surface which comes into contact with a contact surface of the boom in the case of tipover, and further comprises a drive and control system which is configured to stop the boom movement when a predetermined force between the contact surfaces is exceeded as a result of the boom tipping over;

wherein the drive and control system is configured to hold the contact surface of the auxiliary device and the contact surface of the boom at a small mutual distance so that the boom is only capable of limited acceleration during tipover;

wherein the drive and control system comprises measuring means for measuring the mutual distance between the two contact surfaces; and wherein the measuring means comprises optical measuring means.

3. The lifting device according to claim 2, wherein the contact surface of the auxiliary device is in contact with the contact surface of the boom by connecting the auxiliary device to the boom.

4. The lifting device according to claim 2, wherein the mutual distance between the two contact surfaces is kept between a minimum and a maximum distance.

5. The lifting device according to claim 4, wherein the minimum distance amounts to between 1 and 10 mm and the maximum distance to between 5 and 30 mm.

6. The lifting device according claim 4, wherein the mutual distance between the two contact surfaces is kept constant.

7. The lifting device according to claim 4, wherein the mutual distance is the mutual distance in a horizontal direction.

8. The lifting device according to claim 2, wherein the boom has two legs and the auxiliary device provides two contact surfaces which are in contact with corresponding contact surfaces of the boom or, in the case of tipover, come into contact with the two corresponding contact surfaces of the boom.

9. The lifting device according to claim 2, wherein the boom is tiltable around a tilting point and the contact surface of the boom lies at least at ⅖ of the length of the boom from the tilting point.

10. The lifting device according to claim 2, wherein the base comprises an A-frame of the lifting device and the auxiliary device is connected to the A-frame of the lifting device.

11. The lifting device according to claim 10, wherein the auxiliary device is connected to an upper side of the A-frame.

12. The lifting device according to claim 2, wherein the auxiliary device comprises a frame to which is attached a support beam which is displaceable in horizontal direction between end positions using the drive and control system, wherein an end surface of the support beam forms the contact surface.

13. The lifting device according to claim 2, wherein the drive and control system comprises a rack and pinion system which comprises a gear rack driven by a pinion.

14. The lifting device according to claim 13, wherein, when a predetermined torque is exceeded as a result of the boom tipping over, the pinion stops the boom movement through action of a brake on the pinion.

15. The lifting device according to claim 2, wherein the measuring means are provided at the position of the contact surface of the auxiliary device.

* * * * *